(12) United States Patent
De Prisco

(10) Patent No.: US 10,370,955 B2
(45) Date of Patent: Aug. 6, 2019

(54) METHOD OF CALCULATING PORE PRESSURE WHILE DRILLING

(71) Applicant: STATOIL GULF SERVICES LLC, Houston, TX (US)

(72) Inventor: Giuseppe De Prisco, Houston, TX (US)

(73) Assignee: STATOIL GULF SERVICES LLC, Houston, TX (US)

( * ) Notice: Subject to any disclaimer, the term of this patent is extended or adjusted under 35 U.S.C. 154(b) by 661 days.

(21) Appl. No.: 14/645,535

(22) Filed: Mar. 12, 2015

(65) Prior Publication Data

US 2016/0265342 A1 Sep. 15, 2016

(51) Int. Cl.
| | |
|---|---|
| *E21B 7/06* | (2006.01) |
| *E21B 47/06* | (2012.01) |
| *E21B 21/08* | (2006.01) |
| *E21B 17/00* | (2006.01) |
| *G01V 3/38* | (2006.01) |

(52) U.S. Cl.
CPC ............. *E21B 47/06* (2013.01); *E21B 7/06* (2013.01); *E21B 17/00* (2013.01); *E21B 21/08* (2013.01); *G01V 3/38* (2013.01)

(58) Field of Classification Search
None
See application file for complete search history.

(56) References Cited

U.S. PATENT DOCUMENTS

| 2004/0244972 A1 | 12/2004 | Sayers et al. |
| 2007/0285274 A1 | 12/2007 | Esmersoy |
| 2010/0000791 A1 | 1/2010 | Alberty |

FOREIGN PATENT DOCUMENTS

| WO | WO 91/04500 A1 | 4/1991 | |
| WO | WO 9104500 A1 * | 4/1991 | ............. E21B 21/08 |

OTHER PUBLICATIONS

Eaton, "The Effect of Overburden Stress on Geopressure Prediction from Well Logs," Journal of Petroleum Technology, vol. 24, No. 08, Aug. 1972, pp. 929-934.
Eaton, "The Equation for Geopressure Prediction from Well Logs," Society of Petroleum Engineers, Sep. 1975, SPE 5544, pp. 1-5 (11 pages).

* cited by examiner

*Primary Examiner* — Reema Patel
*Assistant Examiner* — Steven M Christopher
(74) *Attorney, Agent, or Firm* — Birch, Stewart, Kolasch & Birch, LLP

(57) ABSTRACT

A method for calculating pore pressure of a subsurface includes the steps of obtaining a resistivity value while drilling in a region wherein there is a shallow depth (reference depth) where shale is in a hydrostatic condition, or where shale is not in hydrostatic condition but where the pore pressure at such depth can be estimated and calculating, using a processor, a pore pressure at a drilling location based on the following Formula (I): $PP = OvB - (OvB - Hyd)(R/R_0) \emptyset_n$, wherein PP is pore pressure, OvB is the overburden value associated with the drilling location, Hyd is hydrostatic pore pressure, R is a measured value of resistivity, $R_0$ is the resistivity at a reference depth or is an imposed value of resistivity, and $\emptyset_n$ is a normalized value of porosity.

12 Claims, 8 Drawing Sheets

METHOD OF CALCULATING PORE PRESSURE WHILE DRILLING

BACKGROUND OF THE INVENTION

1. Field of the Invention

The present invention relates to a method of calculating pore pressure. The method will calculate pore pressure only looking at one log while drilling, for example resistivity logs.

2. Description of Background Art

FIG. 1 shows an exemplary diagram of a drilling operation. One of ordinary skill in the art will appreciate that the drilling operation shown in FIG. 1 is provided for exemplary purposes only and accordingly should not be construed as limiting the scope of the present invention. For example, the drilling operation shown in FIG. 1 is a seafloor drilling operation, but the drilling operation may alternatively be a land drilling operation.

As shown in FIG. 1, a drilling rig 105 is configured to drill into a formation (e.g., a formation below a seafloor 110) using a drill bit (not shown) coupled to the distal end of a drill string 125. Specifically, the drill bit is used to drill a borehole 130 extending to a target lithology 120. The target lithology 120 may be filled by hydrocarbon or a mineral resource targeted by a drilling operation.

Formations in which pore pressure exceeds hydrostatic pressure at a given depth are referred to as overpressured. The mechanism of overpressure itself does not modify the scope of the present invention.

When drilling in an overpressured formation, the mud weight (i.e., the weight of drilling fluids injected into the borehole) must be high enough to prevent either the pore pressure from moving formation fluids into the borehole in case of high enough permeability formation (e.g., sand) or the pore pressure from breaking down the formation and eventually causing borehole-walls collapse in case of low enough permeability formation (e.g., shale). In the worst case of a high enough permeability formation, formation fluids entering a borehole may result in loss of the well and/or injury to personnel operating the drilling rig. Accordingly, for safe and economic drilling, it is essential that the pore pressure be predicted with sufficient accuracy. In particular, it is beneficial to predict pore pressure pre-drill, i.e., either before any drilling has commenced and/or at a location that the drill bit has not yet reached.

Further, when drilling in overpressured formations, the number of required casing strings (i.e., structural supports inserted into the borehole) may be increased. Specifically, if a sufficiently accurate pre-drill pore pressure prediction is not available, additional casing strings may be inserted prematurely to avoid the possibility of well control problems (e.g., influx of formation fluids, borehole collapse, etc.). Prematurely inserting casing strings may delay the drilling operation and/or reduce the size of the borehole and result in financial loss.

The knowledge of accurate pore pressure is crucial when drilling a well in order to ensure the success of the drilling operation. Pore pressure is also a controlling input parameter in borehole stability modeling, well planning, design, and wellpath optimization.

A problem often encountered when drilling wells in many parts of the world is narrow drilling margins that require great precision in pore pressure prediction in order to prevent any shale instability problem resulting in risk of lost circulation and/or gas kicks/blowouts.

There is a great need in the art for a method that makes it possible to accurately predict pore pressure in real time measurements at the rig site. If such data were available, it would also be useful for identifying high risk shallow water zones, optimizing mud weight, detecting shallow hazard zones, detecting abnormal pressure zones, determining formation strength for wellpath optimization, and, in general, for obtaining the most trouble-free, cost effective drilling.

One of the conventional methods of predicting pore pressure is Eaton's method. Eaton's method involves the following equation:

$$PP = OvB - (OvB - Hyd)F$$

wherein PP is pore pressure, OvB is the overburden value associated with the drilling location, Hyd is hydrostatic pore pressure, and F is (in case of resistivity logs):

$$(R/R_E)^{1.2}$$

wherein R is the measured value of resistivity and $R_E$ is the normal compaction trend of resistivity.

The problem with Eaton's method is that the user must pick the correct normal compaction trend, which is sometimes difficult and implies the analysis of offset wells and regional maps. As such, Eaton's method almost never can be applied while drilling, with the knowledge of the real time logs.

Therefore, there is an industry-wide need for a more flexible method of calculating pore pressures.

One of the main bases of the present invention is to properly normalize or scale logs. For example, if we look at the porosity and resistivity logs, and we cross plot these quantities for a number of wells, we may have the plot shown in FIG. 2A. The color code in this case is effective stress, evaluated for each case. Each point in the plot is the average of resistivity and porosity made in only shale lithology for each 20 [m] interval (other values can be 5 [m] or 2 [m] or any other appropriate interval to represent resistivity and porosity there). The shale lithology can be defined through the volume fraction of shale, when this is larger than 65% or 75% or 85% or any other value, larger or lower, that is sufficient to identify a shale. The wells for this case are not compartmentalized. That is, only one pressure gradient exists within the sands in each well. Moreover, all the porosity values larger than 20% are filtered out (typically, these values for shale lithology are in the relatively shallow region), and resistivity of shale close to sand (meaning shale points within 20 [m] or 5 [m] or 2 [m] or any other distance that may affect the resistivity information either because of hydrocarbon leakage in the shale or because of the accuracy/sampling of the resistivity tool) that is not water saturated (for example water saturation less than 85% or 75% or any other percentage that makes the sand not water saturated) is rejected. If a reference of resistivity (Ro) and porosity ($ø_o$) is picked for each well in the shale at the beginning of each log (this means that the reference point is at an arbitrary depth at this stage), and the resistivity and porosity for each log are normalized with the reference values Ro, $ø_o$ (different for each well), a new cross plot can be obtained (FIG. 2B). As evident, all the normalized resistivity logs are following the trend $1/(ø/ø_o)$ that is defined here as normal compaction for the section of shale that goes from the reference point up to the end of the log. Moreover, the color code in this case is pore pressure/effective stress. All the wells are following the trend $1/(ø/ø_o)$ going deeper with depth, except for the wells where pore pressure is larger (in this example at least 2 times) than the value of effective stress at each depth. When pore pressure is larger than effective stress, in fact, the normalized resistivity and porosity are clustered around the normalized point 1,1 even for deeper depth. This means that if pore pressure is large enough, the porosity versus resistivity does not follow the normal compaction trend $1/(\emptyset/\emptyset_o)$, but instead is going to have a larger porosity and lower resistivity compared with the wells where pore pressure is same order with effective stress. Note that the value of 2 is valid for a relatively shallow region. For very deep wells the value or pore pressure/effective stress can increase to 3, 4, or more in order to drive the normalized plot to the position of 1,1. The same analysis could be done cross plotting resistivity vs velocity or other variables. In case the wells are compartmentalized, a more careful selection of the reference depth must be done. For example, with reference to FIG. 2C, the resistivity and porosity in the shale belonging to one compartmentalized well are plotted, all the values being normalize with a resistivity and porosity value in the shale at a depth of reference that in this case is the beginning of the log. The color code in this case is the distance to the reference depth (e.g., deep red color is for depths very close to the reference depth). As evident, no distinct trend can be recognized. However, if, after each compartment has been identified (where each sand lithology has only one pressure gradient), the reference depth is fixed at the beginning of each compartment in the shale region for each compartment (so in this case, there are a different number of reference depths), a clear trend can be identified for each single compartment (FIG. 2D). This is, again, well approximated by $1/(\emptyset/\emptyset_o)$. The pore pressure, going from one compartment to another deeper compartment, is increasing (this results is not shown), almost in step, compared with the local effective stress. The expected trend $1/(\emptyset/\emptyset_o)$ is a good approximation, especially if the shale interval is short enough and within the same compartment. Even a linear trend between normalized resistivity and porosity can be approximated with $1/(\emptyset/\emptyset_o)$ for short intervals. These results give the basis in order to calculate pore pressure.

SUMMARY OF THE INVENTION

The first embodiment of the present invention is directed to a method for calculating pore pressure of a subsurface, comprising obtaining a resistivity value while drilling from a depth of reference up to a specific depth, and evaluating a value of PP in the shale at a depth of reference ($PP_{[depth\ of\ reference]}$) (this value can be also hydrostatic pressure at the depth where shale starts to become under compacted); and calculating, using a processor, a predicted pore pressure at a drilling location based on the following Formula (II):

$$PP=OvB-(OvB-Hyd)(R/R_{0[depth\ of\ reference]})^{\emptyset_n}$$

wherein PP is calculated pore pressure, OvB is the overburden value associated with the drilling location, Hyd is hydrostatic pore pressure, R is the measured value of resistivity from the depth of reference where pore pressure in the shale is known or approximated or estimated, up to any specific depth ($R_{[specific\ depth]}$) where the pressure has to be calculated (for example the position of the drill bit while drilling), $R_{0[depth\ of\ reference]}$ is an imposed value of the resistivity at the depth of reference that is evaluated as:

$$R_{0[depth\ of\ reference]}=(OvB-Hyd)R_0/(OvB-PP_{[depth\ of\ reference]})$$

Here $R_0$ is the measured value of resistivity at the depth of reference, and $\emptyset_n$ is defined as a normalized porosity $\emptyset/\emptyset_o$. Because the value of the porosity at the reference depth is $\emptyset_o$, $\emptyset_n$ is a vector increasing from 1 up to $1/(R_{[specific\ depth]}/R_0)$, which is the normalized resistivity at the specific depth, for example at the position of the drill bit. Because of the noise present in the log, the resistivity at depth of reference $R_0$ can be estimated as the average along a relatively large depth. In this case, the function $\emptyset/\emptyset_o$ goes from $R_0/R_{[depth\ reference]}$. The resistivity and porosity logs can be smoothed in order to minimize the influence of the noise with a low pass filter, or a moving average, or any other techniques that can reduce the noise.

At this point, the calculation of pore pressure can keep going at deeper intervals, having the new depth of reference as the specific depth at the previous step (old):

$$\text{New } Z_{[depth\ of\ reference]}=\text{Old }_{[specific\ depth]}$$

The pore pressure at the new depth of reference in the shale is the value of pore pressure calculated at the previous step $$PP=OvB-(OvB-Hyd)(R/R_{0[depth\ of\ reference]})^{\emptyset_n}$$

These calculations can continue until the maximum or desired depth is reached. In each step, the difference $Z_{[specific\ depth]}-Z_{[depth\ of\ reference]}$ should be short enough in a way that the relation between normalized resistivity and porosity can be approximated by $1/(\emptyset/\emptyset_o)$. The inventor verified that this is the case for the majority of compartments. However, the interval of analysis $Z_{[specific\ depth]}-Z_{[depth\ of\ reference]}$ cannot be too short because of the noise in the data. An interval too short can corrupt the pore pressure calculation adding spurious effects from noise that cannot be filtered out because of the length of the interval.

The method may also include adjusting, using the processor, a drilling operation associated with the drilling location based on the predicted pore pressure. The step of adjusting the drilling operation may include at least one selected from the group consisting of adjusting a drilling fluid density, adjusting a drilling trajectory, and optimizing a number of casing strings in a borehole. The drilling location may include a location below an operating drill bit in a borehole. The predicted pore pressure may be displayed on a graphical user interface.

The second embodiment of the present invention is directed to a non-transitory computer readable medium comprising instructions to perform a method for pore pressure calculation, the instructions executable on a processor and comprising functionality for obtaining a resistivity value while drilling from a depth of reference up to a specific depth, and evaluating a value of PP in the shale at a depth of reference ($PP_{[depth\ of\ reference]}$) (this value can be also hydrostatic pressure at the depth where shale starts to become under compacted); and calculating, using a processor, a predicted pore pressure at a drilling location based on the following Formula (II):

$$PP=OvB-(OvB-Hyd)(R/R_{0[depth\ of\ reference]})^{\emptyset_n}$$

wherein PP is calculated pore pressure, OvB is the overburden value associated with the drilling location, Hyd is hydrostatic pore pressure, R is the measured value of resistivity from the depth of reference) where pore pressure in the shale is known or approximated or estimated, up to any specific depth ($R_{[specific\ depth]}$) where the pressure has to be calculated (for example the position of the drill bit while drilling), $R_{0[depth\ of\ reference]}$ is an imposed value of the resistivity at the depth of reference that is evaluated as:

$$R_{0[depth\ of\ reference]}=(OVB-Hyd)R_0/(OvB-PP_{[depth\ of\ reference]})$$

Here, $R_0$ is the measured value of resistivity at the depth of reference, and $ø_o$ is defined as a normalized porosity $ø/ø_o$. Because the value of the porosity at the reference depth is $ø_o$, $ø_n$ is a vector increasing from 1 up to $1/(R_{[specific\ depth]}/R_0)$, which is the normalized resistivity at the specific depth, for example at the position of the drill bit. Because of the noise present in the log, the resistivity at depth of reference $R_0$ can be estimated as the average along a relatively large depth. In this case the function $ø/ø_o$ goes from $R_0/R_{[depth\ reference]}$. The resistivity and porosity logs can be smoothed in order to minimize the influence of the noise with a low pass filter, or a moving average, or any other techniques that can reduce the noise.

At this point, the calculation of pore pressure can continue at deeper intervals, having the new depth of reference as the specific depth at the previous step (old): New $Z_{[depth\ of\ reference]}$=Old $Z_{[specific\ depth]}$ The pore pressure at the new depth of reference in the shale is the value of pore pressure calculated at the previous step $$PP=OvB-(OvB-Hyd)(R/R_{0[depth\ of\ reference]})^{ø_n}$$

These calculations can continue until the maximum or desired depth is reached. In each step, the difference $Z_{[specific\ depth]}-Z_{[depth\ of\ reference]}$ should be short enough in a way that the relation between normalized resistivity and porosity can be approximated by $1/(ø/ø_o)$. The inventor verified that this is the case for the majority of compartments. However, the interval of analysis $Z_{[specific\ depth]}-Z_{[depth\ of\ reference]}$ cannot be too short because of the noise in the data. An interval too short can corrupt the pore pressure calculation adding spurious effects from noise that cannot be filtered out because of the length of the interval.

The method may also include adjusting, using the processor, a drilling operation associated with the drilling location based on the predicted pore pressure. The step of adjusting the drilling operation may include at least one selected from the group consisting of adjusting a drilling fluid density, adjusting a drilling trajectory, and optimizing a number of casing strings in a borehole. The drilling location may include a location below an operating drill bit in a borehole. The predicted pore pressure may be displayed on a graphical user interface.

The third embodiment of the present invention is directed to a downhole tool configured to perform a method for pore pressure prediction, the downhole tool comprising a processor; a memory comprising software instructions for enabling the downhole tool under control of the processor to obtain a resistivity value while drilling from a depth of reference up to a specific depth, and evaluating a value of PP in the shale at a depth of reference ($PP_{[depth\ of\ reference]}$) (this value can be also hydrostatic pressure at the depth where shale starts to become under compacted); and calculating, using a processor, a predicted pore pressure at a drilling location based on the following Formula (II):

$$PP=OvB-(OvB-Hyd)(R/R_{0[depth\ of\ reference]})^{ø_n}$$

wherein PP is calculated pore pressure, OvB is the overburden value associated with the drilling location, Hyd is hydrostatic pore pressure, R is the measured value of resistivity from the depth of reference where pore pressure in the shale is known or approximated or estimated, up to any specific depth ($R_{[specific\ depth]}$) where the pressure has to be calculated (for example the position of the drill bit while drilling), $R_{0[depth\ of\ reference]}$ is an imposed value of the resistivity at the depth of reference that is evaluated as:

$$R_{0[depth\ of\ reference]}=(OvB-Hyd)R_0/(OvB-PP_{[depth\ of\ reference]})$$

Here $R_0$ is the measured value of resistivity at the depth of reference, and $ø_o$ is defined as a normalized porosity $ø/ø_o$. Because the value of the porosity at the reference depth is $ø_o$, $ø_n$ is a vector increasing from 1 up to $1/(R_{[specific\ depth]}/R_0)$, which is the normalized resistivity at the specific depth, for example at the position of the drill bit. Because of the noise present in the log, the resistivity at depth of reference $R_0$ can be estimated as the average along a relatively large depth. In this case the function $ø/ø_o$ goes from $R_0/R_{[depth\ reference]}$. The resistivity and porosity logs can be smoothed in order to minimize the influence of the noise with a low pass filter, or a moving average, or any other techniques that can reduce the noise.

At this point, the calculation of pore pressure can continue at deeper intervals, having the new depth of reference as the specific depth at the previous step (old): New $Z_{[depth\ of\ reference]}$=Old $Z_{[specific\ depth]}$ The pore pressure at the new depth of reference in the shale is the value of pore pressure calculated at the previous step $$PP=OvB-(OvB-Hyd)(R/R_{0[depth\ of\ reference]})^{ø_n}$$

These calculations can continue until the maximum or desired depth is reached. In each step, the difference $Z_{[specific\ depth]}-Z_{[depth\ of\ reference]}$ should be short enough in a way that the relation between normalized resistivity and porosity can be approximated by $1/(ø/ø_o)$. The inventor verified that this is the case for the majority of compartments. However, the interval of analysis $Z_{[specific\ depth]}-Z_{[depth\ of\ reference]}$ cannot be too short because of the noise in the data. An interval too short can corrupt the pore pressure calculation adding spurious effects from noise that cannot be filtered out because of the length of the interval.

The method may also include adjusting, using the processor, a drilling operation associated with the drilling location based on the predicted pore pressure. The step of adjusting the drilling operation may include at least one selected from the group consisting of adjusting a drilling fluid density, adjusting a drilling trajectory, and optimizing a number of casing strings in a borehole. The drilling location may include a location below an operating drill bit in a borehole. The predicted pore pressure may be displayed on a graphical user interface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to one of ordinary skill in the art from this detailed description.

DETAILED DESCRIPTION OF THE INVENTION

Figure 1:
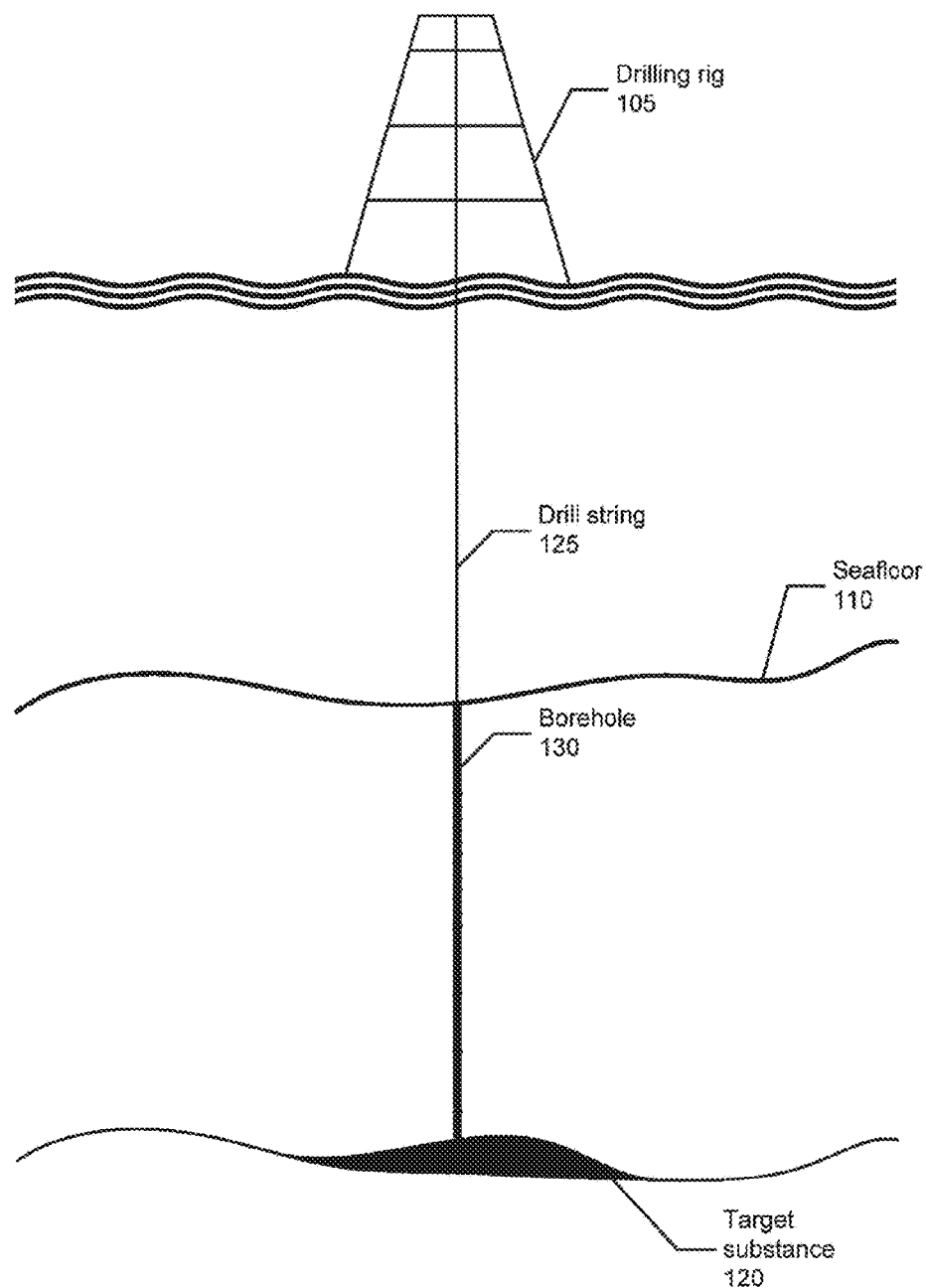
FIG. 1 shows an exemplary diagram of a drilling operation.
Figure 2A:
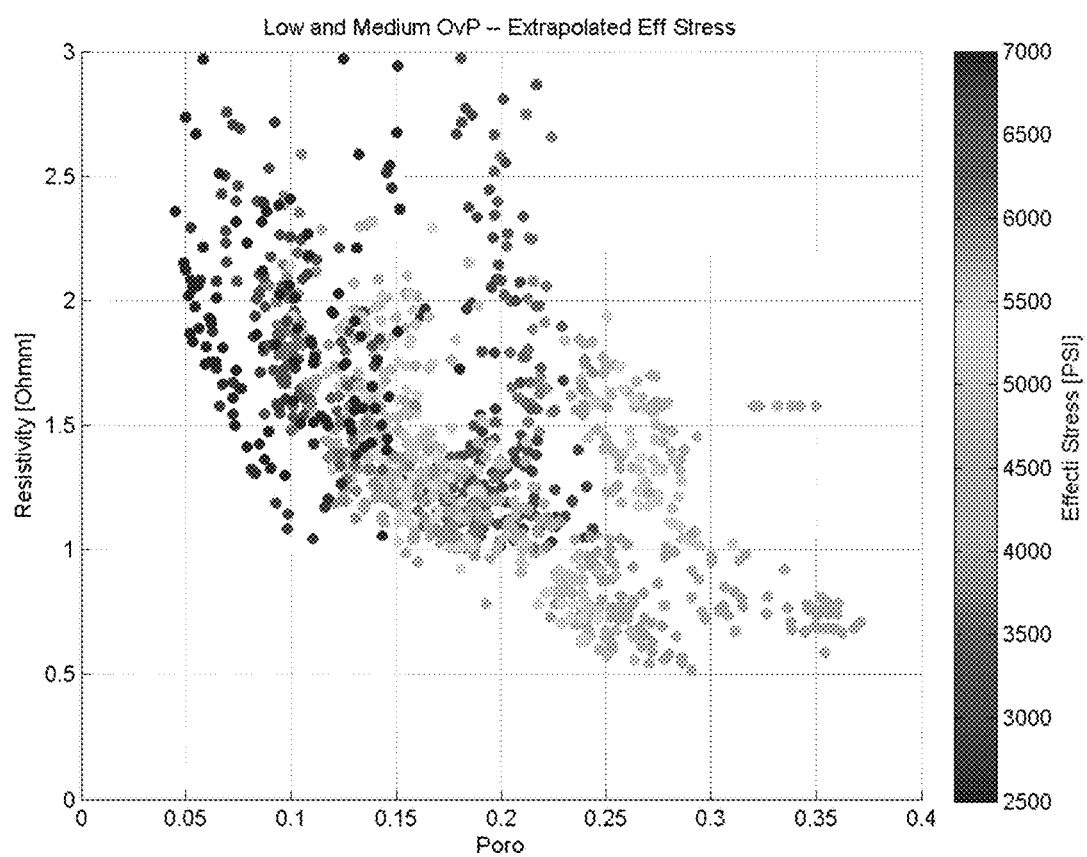
FIGS. 2A-2D show cross plots related to the present invention.
Figure 2B:
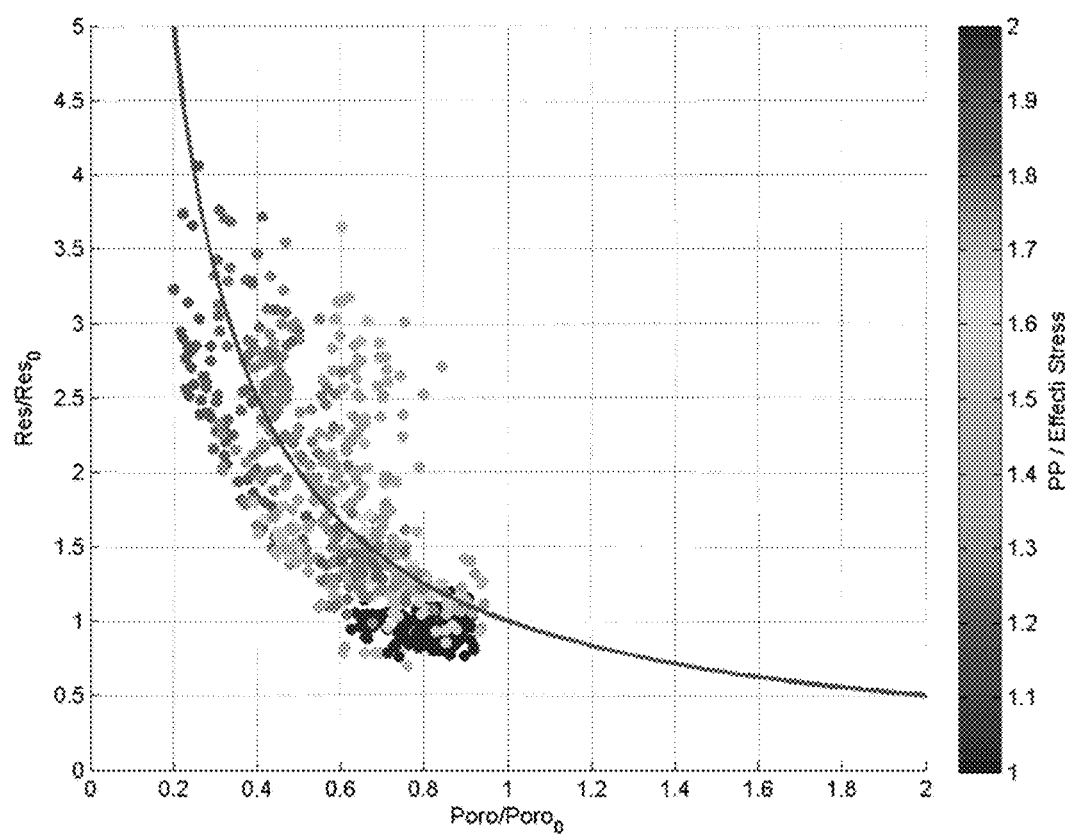
Figure 2C:
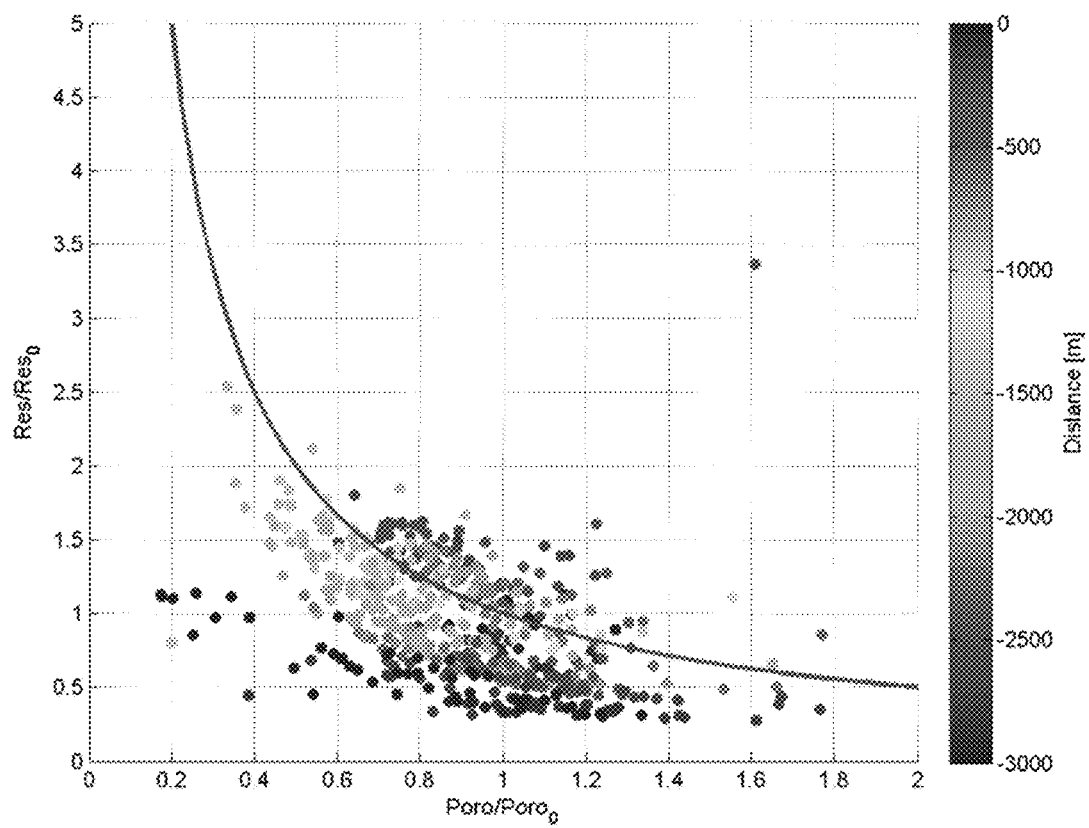
Figure 2D:
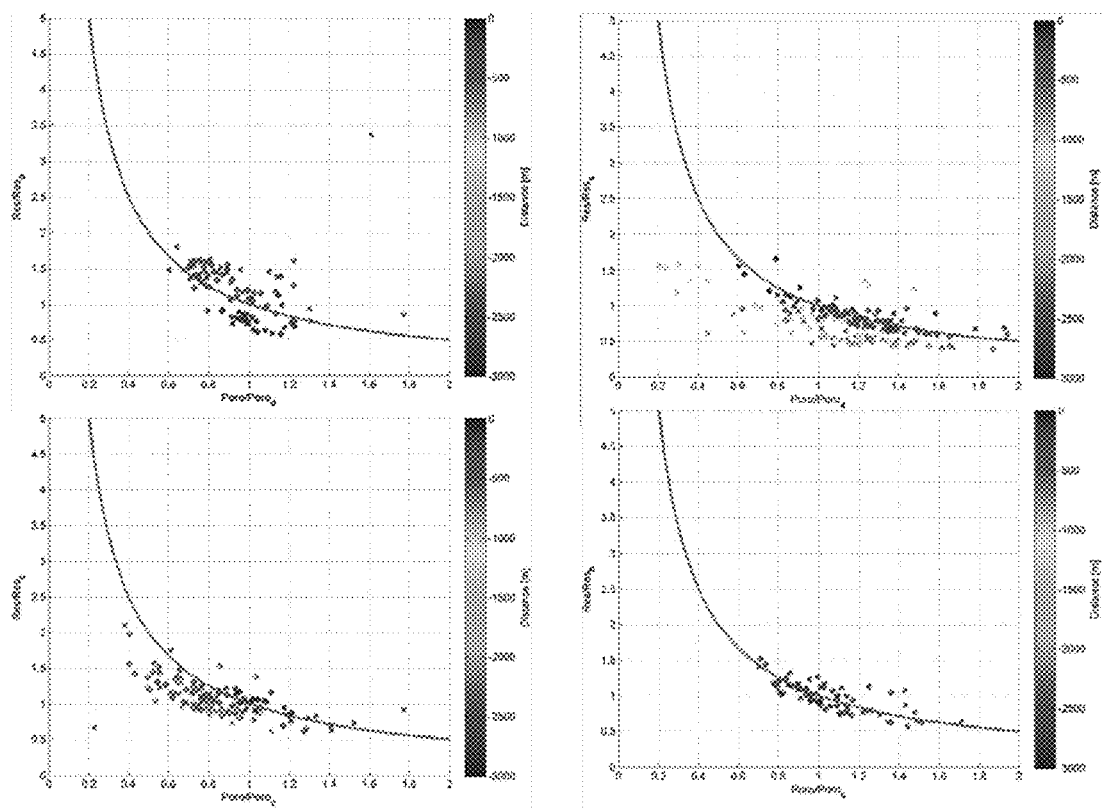

The present invention will now be described with reference to the accompanying drawings.

The present invention is directed to a method for calculating pore pressure based on a resistivity log and only one pressure measurement or pressure estimation as reference. This method calculates a resistivity reference based on a pressure measurement at one specific depth. Then, a calculation of pore pressure for all deeper points is made. This calculation does not require any other parameters, normal compaction trends, or a tuning coefficient.

Specifically, values are plotted on a graph with pressure on the x-axis and depth on the y-axis. An overburden line shows the maximum pressure to be expected based on the depth and density of the region. A hydrostatic line is the minimum pressure to be expected based on the region. Then, based on a single pore pressure measurement, pore pressures can be predicted up to the depth where resistivity measurements are available. These pore pressures are between the overburden line and the hydrostatic line.

As discussed above, one conventional method of predicting pore pressure is Eaton's method. Eaton's method involves the following equation, in case resistivity logs are available:

$$PP = OvB - (OvB - Hyd)F$$

wherein PP is pore pressure, OvB is the overburden associated with the drilling location, Hyd is hydrostatic pore pressure, and F is:

$$(R/R_E)^{1.2}$$

wherein R is the measured value of resistivity and $R_E$ is the normal compaction trend of resistivity.

The present invention improves upon Eaton's method in order to more accurately predict pore pressure in a way that the calculation can be done while drilling. Specifically, the modified equation is the following Formula (I):

$$PP = OvB - (OvB - Hyd)(R/R_{0[depth\ of\ reference]})^{\emptyset_n}$$

wherein PP is calculated pore pressure, OvB is the overburden value associated with the drilling location, Hyd is hydrostatic pore pressure, R is the measured value of resistivity from the depth of reference where pore pressure in the shale is known or approximated or estimated up to any specific depth ($R_{[specific\ depth]}$) where the pressure has to be calculated (for example the position of the drill bit while drilling), $R_{0[depth\ of\ reference]}$ is an imposed value of the resistivity at the depth of reference that is evaluated as:

$$R_{0[depth\ of\ reference]} = (OvB - Hyd)R_0/(OvB - PP_{[depth\ of\ reference]})$$

Here $R_0$ is the measured value of resistivity at the depth of reference, and $\emptyset_n$ is defined as a normalized porosity $\emptyset/\emptyset_o$. Because the value of the porosity at the reference depth is $\emptyset_o$, $\emptyset_n$ is a vector increasing from 1 up to $1/(R_{[specific\ depth]}/R_0)$, which is the normalized resistivity at the specific depth, for example at the position of the drill bit. Because of the noise present in the log, the resistivity at depth of reference $R_0$ can be estimated as the average along a relatively large depth. In this case, the function $\emptyset/\emptyset_o$ goes from $R_0/R_{[depth\ reference]}$. The resistivity and porosity logs can be smoothed in order to minimize the influence of the noise with a low pass filter, or a moving average, or any other techniques that can reduce the noise.

At this point, the calculation of pore pressure can continue at deeper intervals, having the new depth of reference as the specific depth at the previous step.

Thus, the method of the present invention can calculate pore pressure without the need of a normal compaction trend or tuning parameters. The method only needs one calibration point where pore pressure has to be known and a resistivity log.

With the pore pressure calculations explained, the different embodiments of the present invention can be further explained. In general, embodiments of the present invention provide a method and system for pore pressure prediction using the formulas discussed above. Then, a drilling operation associated with the drilling location is adjusted based on the predicted pore pressure.

Figure 3:
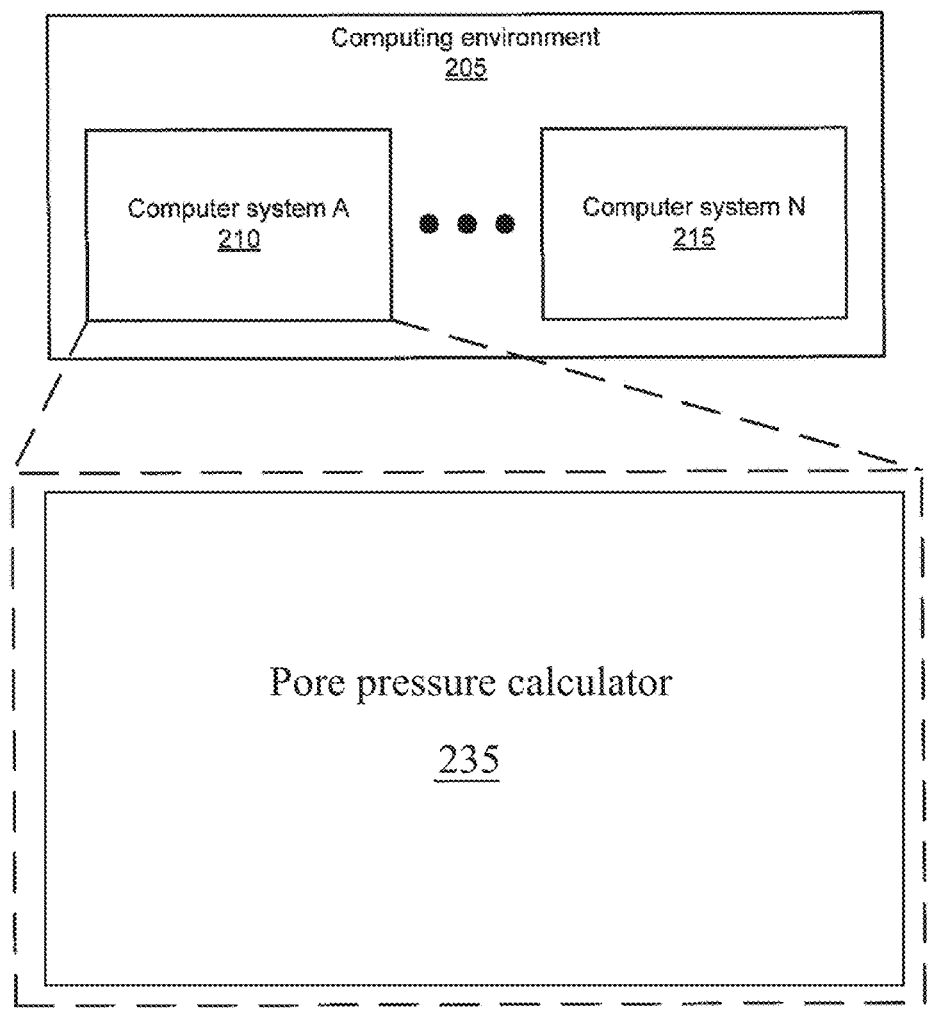
FIG. 3 shows a diagram of a system in accordance with one or more embodiments of the present invention.

FIG. 3 shows a diagram of a system in accordance with one or more embodiments of the present invention. Specifically, FIG. 3 shows a diagram of a computing environment 205 in accordance with one or more embodiments of the present invention.

In one or more embodiments of the present invention, the computing environment 205 may include one or more computer systems (e.g., computer system A 210, computer system N 215) configured to perform drilling-related tasks. In one or more embodiments of the present invention, the computer system(s) (e.g., 210, 215) may be web servers, embedded systems (e.g., a computer located in a downhole tool), desktop computers, laptop computers, personal digital assistants, any other similar type of computer system, or any combination thereof.

Specifically, in one or more embodiments of the present invention, one or more of the computer systems (e.g., 210, 215) may include a pore pressure calculator 235. In one or more embodiments of the present invention, the pore pressure calculator 235 may be located in a single computer system (e.g., 210, 215), distributed across multiple computer systems (e.g., 210, 215), or any combination thereof. In one or more embodiments of the present invention, the pore pressure calculator 235 may include one or more software modules, one or more hardware modules, or any combination thereof. Further, in one or more embodiments of the present invention, the pore pressure calculator may be configured to communicate with each other via function calls, application program interfaces (APIs), a network protocol (i.e., a wired or wireless network protocol), electronic circuitry, any other similar type of communication and/or communication protocol, or any combination thereof.

In one or more embodiments of the invention, the pore pressure calculator 235 may be configured to calculate a predicted pore pressure based on Formula (I).

Figure 4:
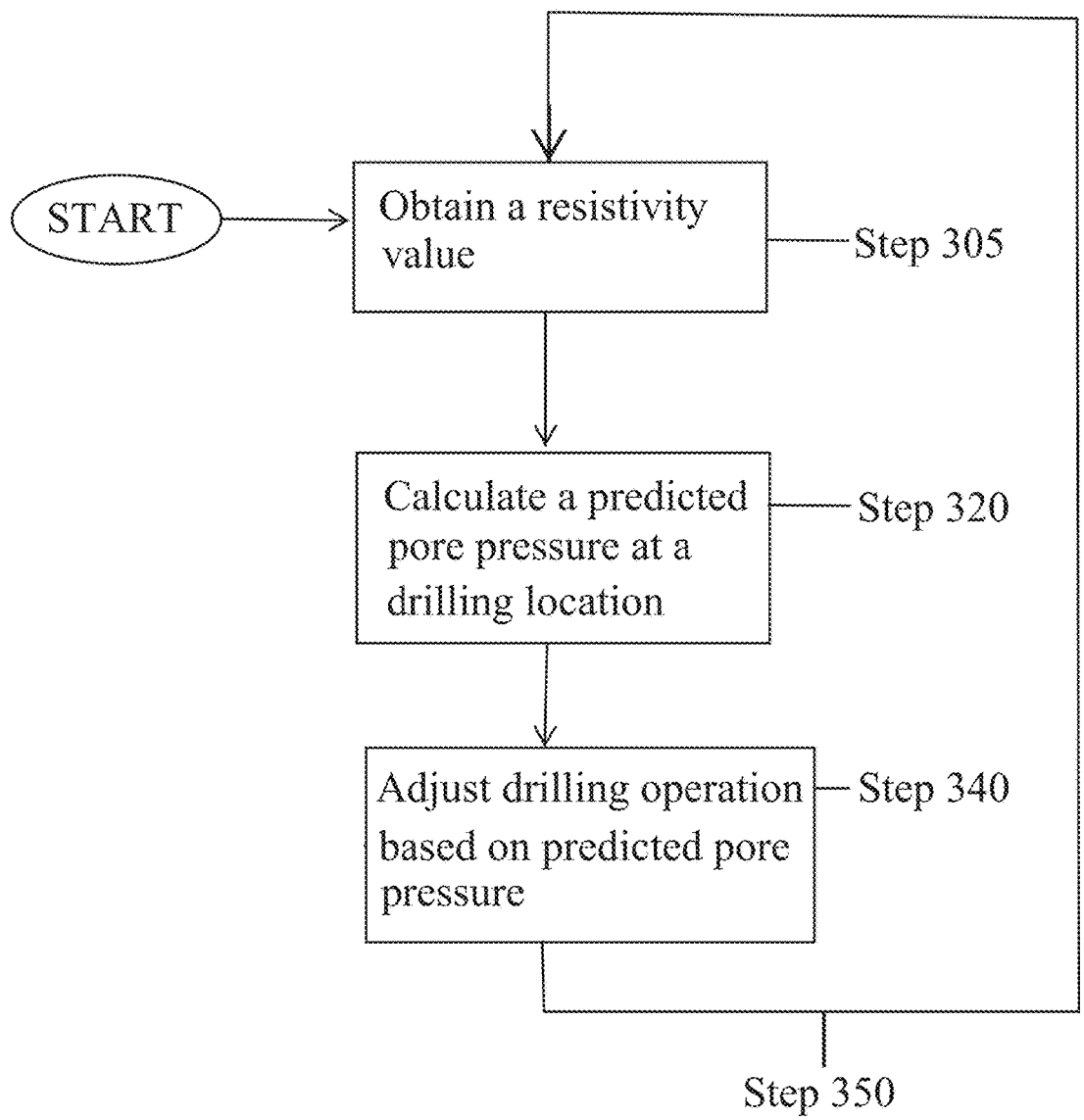
FIG. 4 shows a flowchart in accordance with one or more embodiments of the present invention.

FIG. 4 shows a flowchart in accordance with one or more embodiments of the present invention. Specifically, FIG. 4 shows a flowchart of a method for pore pressure prediction in accordance with one or more embodiments of the present invention.

In one embodiment of the present invention, a drilling location corresponds to a location that has not yet been drilled. In other words, the drill bit has not reached the drilling location. However, the drilling location is in the intended path of the drill bit and, unless the trajectory of the borehole changes, the drill bit will eventually reach the drilling location. In one embodiment of the present invention, the method described in FIG. 4 may be performed while drilling, prior to drilling (i.e., prior to commencing the drilling of the borehole), or any combination thereof Turning to FIG. 4, a resistivity value is obtained (Step 305). Specifically, in one or more embodiments of the present invention, the resistivity value may include values associated with one or more reference depths. In one or more embodiments of the present invention, the reference depths may include locations in one or more offset wells, simulated geologic formations, any other similar type of location, or any combination thereof In Step 320, a predicted pore pressure at a drilling location is calculated using Formula (I). Then, in Step 340, the drilling operation is adjusted based on the calculated pore pressure. Specifically, in one or more embodiments of the present invention, adjusting the drilling operation may involve adjusting a drilling fluid density (i.e., increasing or decreasing the drilling fluid density as appropriate), adjusting a drilling trajectory (e.g., to avoid an overpressured area, to pass through a low-pressure area, etc.), optimizing the number of casing strings in the borehole (i.e., adding a casing string, delaying addition of a casing string, etc.), or any other similar type of adjustment.

These steps can continue until the maximum or desired depth is reached (Step 350).

One or more embodiments of the present invention provide a means for accurately calculating a pore pressure. Accordingly, one or more embodiments of the present invention may prevent formation fluids from entering a borehole, thereby preventing damage to the well and/or personnel operating a drilling rig. Further, one or more embodiments of the present invention may prevent the financial overhead of prematurely inserting casing strings.

Figure 5:
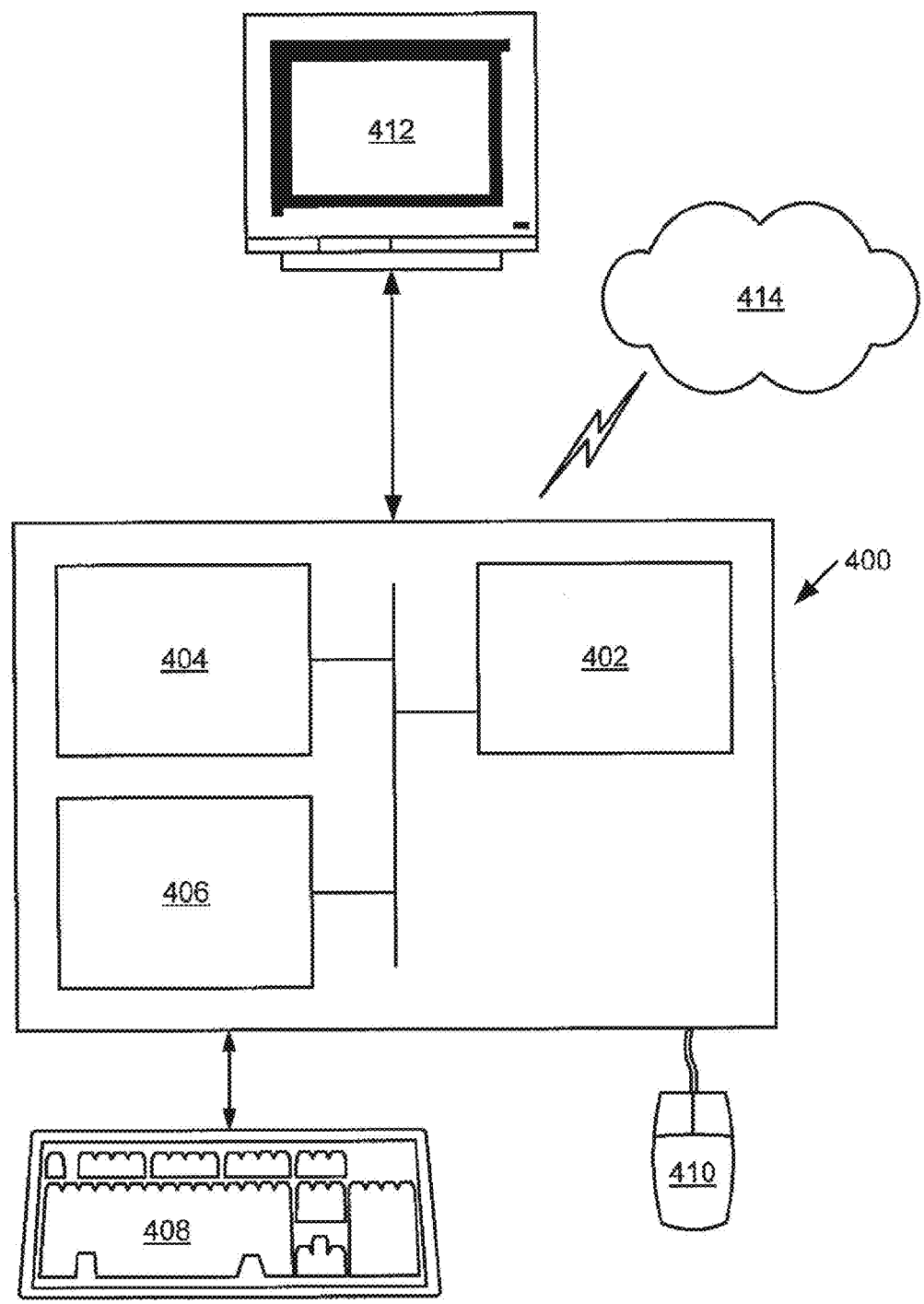
FIG. 5 shows a diagram of a computer system in accordance with one or more embodiments of the present invention.

The present invention may be implemented on virtually any type of computer regardless of the platform being used. For example, as shown in FIG. 5, a computer system 400 includes a processor 402, associated memory 404, a storage device 406, and numerous other elements and functionalities typical of today's computers (not shown). The computer 400 may also include input means, such as a keyboard 408 and a mouse 410, and output means, such as a monitor 412. The computer system 400 may be connected to a network 414 (e.g., a local area network (LAN), a wide area network (WAN) such as the Internet, or any other similar type of network) via a network interface connection (not shown). One of ordinary skill in the art will appreciate that these input and output means may take other forms.

Furthermore, one of ordinary skill in the art will appreciate that one or more elements of the aforementioned computer system 400 may be located at a remote location and connected to the other elements over a network. Further, software instructions to perform embodiments of the present invention may be stored on a non-transitory computer readable medium such as a compact disc (CD), a diskette, a tape, a file, or any other non-transitory computer readable storage device. In addition, in one embodiment of the present invention, the predicted pore pressure (including all the pore pressures calculated using the method described in FIG. 4) may be displayed to a user via a graphical user interface (e.g., a display device).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of estimating pore pressure (PP) of a subsurface at a drilling location, the method comprising:
   measuring a resistivity value ($R_0$) while drilling in a region having a pore pressure ($PP_{[depth\ of\ reference]}$) that is known or can be approximated at a depth of reference;
   determining from the resistivity value ($R_0$) and the pore pressure ($PP_{[depth\ of\ reference]}$) at the depth of reference an imposed resistivity value ($R_{0[depth\ of\ reference]}$) at the depth of reference;
   measuring a resistivity value (R) in an interval of the subsurface from the depth of reference to a depth of the drilling location;
   calculating, using a processor, the pore pressure (PP) at the drilling location based on the following Formula (I):

$$PP = OvB - (OvB - Hyd)(R/R_{0[depth\ of\ reference]})^{\emptyset_n}$$

wherein PP is the pore pressure, OvB is an overburden pressure value associated with the drilling location, Hyd is hydrostatic pore pressure, R is the measured resistivity value for the interval from the depth of reference to the depth of the drilling location, $R_{0[depth\ of\ reference]}$ is the imposed resistivity value at the depth of reference, and $\emptyset_n$ is a normalized value of porosity;
   adjusting, using the processors, a drilling operation associated with a new drilling location based on the estimated pore pressure, wherein said adjusting comprises optimizing a number of casing strings in the borehole; and
   repeating the steps of the method using the depth of the drilling location as a new depth of reference to estimate pore pressure at the new drilling location of the subsurface wherein a pore pressure at the new depth of reference is the estimated pore pressure (PP) at the drilling location.

2. The method of claim 1, wherein adjusting the drilling operation further comprises at least one of adjusting a drilling fluid density and adjusting a drilling trajectory.

3. The method of claim 1, wherein the drilling location comprises a location below an operating drill bit in a borehole.

4. The method of claim 1, wherein the estimated pore pressure is displayed on a graphical user interface.

5. A non-transitory computer readable medium comprising instructions to perform a method for pore pressure (PP) estimation at a drilling location of a subsurface, the instructions executable on a processor and comprising functionality for:
   measuring a resistivity value ($R_0$) while drilling in a region having a pore pressure ($PP_{[depth\ of\ reference]}$) that is known or can be approximated at a depth of reference;
   determining from the resistivity value ($R_0$) and the pore pressure ($PP_{[depth\ of\ reference]}$) at the depth of reference an imposed resistivity value ($R_{0[depth\ of\ reference]}$) at the depth of reference;
   measuring a resistivity value (R) in an interval of the subsurface from the depth of reference to a depth of the drilling location;
   calculating, using a processor, the pore pressure (PP) at the drilling location based on the following Formula (I):

$$PP = OvB - (OvB - Hyd)(R/R_{0[depth\ of\ reference]})^{\emptyset_n}$$

wherein PP is the pore pressure, OvB is an overburden pressure value associated with the drilling location, Hyd is hydrostatic pore pressure, R is the measured resistivity value for the interval from the depth of reference to the depth of the drilling location, $R_{0[depth\ of\ reference]}$ is the imposed resistivity value at the depth of reference, and $\emptyset n$ is a normalized value of porosity;

adjusting, using the processors, a drilling operation associated with a new drilling location based on the estimated pore pressure, wherein said adjusting comprises optimizing a number of casing strings in the borehole; and repeating the steps of the method using the depth of the drilling location as a new depth of reference to estimate pore pressure at the new drilling location of the subsurface wherein a pore pressure at the new depth of reference is the estimated pore pressure (PP) at the drilling location.

6. The non-transitory computer readable medium of claim 5 wherein adjusting the drilling operation comprises at least one selected from the group consisting of adjusting a drilling fluid density and adjusting a drilling trajectory.

7. The non-transitory computer readable medium of claim 5, wherein the drilling location comprises a location below an operating drill bit in a borehole.

8. The non-transitory computer readable medium of claim 5, wherein the estimated pore pressure is displayed on a graphical user interface.

9. A downhole tool configured to perform a method for pore pressure (PP) estimation at a drilling location of a subsurface, the downhole tool comprising:

a processor;

a memory comprising software instructions for enabling the downhole tool under control of the processor to:

measure a resistivity value ($R_0$) while drilling in a region having a pore pressure ($PP_{[depth\ of\ reference]}$) that is known or can be approximated at a depth of reference;

determine from the resistivity value ($R_0$) and the pore pressure ($PP_{[depth\ of\ reference]}$) at the depth of reference an imposed resistivity value ($R_{0[depth\ of\ reference]}$) at the depth of reference;

measure a resistivity value (R) in an interval of the subsurface from the depth of reference to a depth of the drilling location;

calculate, using a processor, the pore pressure at the drilling location based on the following Formula (I):

$$PP=OvB-(OvB-Hyd)(R/R_{0[depth\ of\ reference]})^{\varnothing_n}$$

wherein PP is the pore pressure, OvB is an overburden pressure value associated with the drilling location, Hyd is hydrostatic pore pressure, R is the measured resistivity value for the interval from the depth of reference to the depth of the drilling location, $R_{0[depth\ of\ reference]}$ is the imposed resistivity value at the depth of reference, and øn is a normalized value of porosity;

adjust, using the processors, a drilling operation associated with a new drilling location based on the estimated pore pressure, wherein said adjusting comprises optimizing a number of casing strings in the borehole; and repeat the steps of the method using the depth of the drilling location as a new depth of reference to estimate pore pressure at the new drilling location of the subsurface wherein a pore pressure at the new depth of reference is the estimated pore pressure (PP) at the drilling location.

10. The downhole tool of claim 9, wherein adjusting the drilling operation comprises at least one selected from the group consisting of adjusting a drilling fluid density and adjusting a drilling trajectory.

11. The downhole tool of claim 9, wherein the drilling location comprises a location below an operating drill bit in a borehole.

12. The downhole tool of claim 9, wherein the estimated pore pressure is displayed on a graphical user interface.

* * * * *